United States Patent [19]

Kang

[11] Patent Number: 6,064,368
[45] Date of Patent: May 16, 2000

[54] USER INTERFACE DEVICE FOR PC SYSTEM

[75] Inventor: Sung Chul Kang, Pyungtaek, Rep. of Korea

[73] Assignee: LG Electronics Inc., Seoul, Rep. of Korea

[21] Appl. No.: 09/056,671

[22] Filed: Apr. 8, 1998

[30] Foreign Application Priority Data

Apr. 9, 1997 [KR] Rep. of Korea ............ 97/13080

[51] Int. Cl.[7] .................................. G09G 5/08
[52] U.S. Cl. ........................... 345/158; 345/169
[58] Field of Search ........................ 345/156, 158, 345/168, 169; 341/22, 21

[56] References Cited

U.S. PATENT DOCUMENTS

| | | | |
|---|---|---|---|
| 5,844,547 | 12/1998 | Minakuchi et al. | 345/156 |
| 5,880,745 | 3/1999 | Miichi | 345/156 |
| 5,903,259 | 5/1999 | Brusky et al. | 345/169 |
| 5,920,308 | 7/1999 | Kim | 345/168 |
| 5,926,170 | 7/1999 | Oba | 345/168 |
| 5,949,403 | 9/1999 | Umeda et al. | 345/158 |

*Primary Examiner*—Amare Mengistu
*Attorney, Agent, or Firm*—Finnegan, Henderson, Farabow, Garrett & Dunner, L.L.P.

[57] ABSTRACT

A user interface device for a PC system capable of converting user interface data transmitted from an external input device to data which can be recognized by the PC system includes an interface controller which is connected between a remote controller receiver and a system having a system BIOS program and outputs a system management interrupt (SMI) to the system when receiving data from the remote controller receiver and outputs a remote controller key code to the system in accordance with a first and a second transmission commands supplied from the system. An application program is performed by the remote controller key code supplied to the system, for thus previously applied receiver and keyboard controller can be continuously used although a function of the external input device such as the remote controller is changed.

11 Claims, 6 Drawing Sheets

USER INTERFACE DEVICE FOR PC SYSTEM

BACKGROUND OF THE INVENTION

1. Field of the Invention

The present invention relates to a user interface fabrication for a PC system, and more particularly to a user interface device for a PC system, which is capable of converting user interface data outputted from external input devices such as a remote controller to data which may be recognized by a PC system.

2. Discussion of the Background

FIG. 1 illustrates a conventional user interface in a PC system for which a keyboard and a mouse are used as external input devices.

As shown therein, a keyboard 40 and a mouse 50 which are connected with a keyboard controller 30 through clock lines KCLK, MCLK and data lines KDATA, MDATA respectively supply 11 bit serial data, that is a start bit, 8 data bits, a parity bit and a stop bit, to the keyboard controller 30, and the keyboard controller 30 outputs a clock signal to the key board 40 and the mouse 50, respectively. The keyboard controller 30 supplies interrupt signals IRQ1,IRQ12 to a system 60 and transmits a data format which can be recognized by the system 60 to the system 60 through an 8 bit data bus XD0–XD7. The system 60 performs an application program in accordance with the input data, for thereby using the data when necessary.

FIG. 2 illustrates another conventional user interface to which a remote controller 10 is additionally supplied to the construction of the user interface shown in FIG. 1.

As shown therein, there are provided a remote controller 10 for transmitting a radio signal in accordance with a key input generated by a user and a receiver 20 for supplying predetermined code data corresponding to the radio signal to the keyboard controller 30. The operation of the keyboard 40 and the mouse 50 is same as the above-described operation. An operation of the remote controller 10 will be described as follows.

When the user presses a predetermined key of the remote controller 10, the remote controller 10 converts an 1 byte key code to a radio signal, such as an infrared, of a predetermined format, for example a 2 byte signal comprised of 1 byte ID and 1 byte data, and transmits the converted signal through a data line RDATA to the receiver 20 which generates serial key code data corresponding to the signal received from the remote controller 10 and supplies the generated key code data to the keyboard controller 30 in accordance with the clock signal from the keyboard controller 30.

The keyboard controller 30 applies a system management interrupt (SMI) to the system 60. Here, the interrupt SEMI for system power management is applied at least in PC 386, and the system 60 which has received the interrupt SMI prepares for support of a BIOS code by which a routine of an internal program jumps to a corresponding address, and thus it becomes possible for a system BIOS to be interfaced with the remote controller 10.

After the system 60 has been ready, the keyboard controller 30 supplies the inputted key code data through the data bus XD0–XD7 to the system 60 which stores the inputted code in a predetermined memory such as NVRAM, for thus the code may be applied to other application programs.

On the other hand, in the thusly operated system, the function of the external input device may be changed. Specifically, additional functions may be supplied to the remote controller for the convenience of the user, or a separate input device such as a scanning logic may be added thereto.

When the functions of the remote controller are changed, the corresponding codes are also changed. However, since the keyboard controller converts input data and unconditionally transmits the converted data to the system, the fixed functions are not able to process the changed codes. Accordingly, when changing the function of the remote controller or adding a separate external device, a receiver and a keyboard controller which are newly designed according to the changed external device should be supplied instead of the currently used receiver and keyboard controller. In addition, the BIOS program in the system should be modified in accordance with the external device.

The changing of the system BIOS program may not be problematic. However. the change of the keyboard controller is difficult because a new hardware must be provided therefor. In other words, the keyboard controller in the system should be changed although there is needed simple modification of the external input device, thereby degrading the compatibility and costing a great deal due to the change of the hardware.

SUMMARY OF THE INVENTION

Accordingly, the present invention is directed to a user interface that obviates the problems due to the related art.

An object of the present invention is to provide a remote controller user interface that continuously uses a receiver and a keyboard controller which have been used although a function of an external input device are changed.

Another object of the present invention is to provide a remote controller user interface that supports various function changes without any alteration of codes of a remote controller by using an SMI service of a PC system.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a PC system includes a remote controller detached from the PC system and transmitting a remote signal, a main system having an input control program, an interface controller providing a SMI signal to the main system in response to the remote signal and providing an input key code signal corresponding to the remote signal, and a keyboard controller providing an output key code signal, corresponding to said input key code signal, to the main system.

It is to be understood that both the foregoing general description and the following detailed description are exemplary and explanatory and are intended to provide and further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Reference will now be made in detail to the preferred embodiments of the present invention, examples of which are illustrated in the accompanying drawings.

Figure 1:
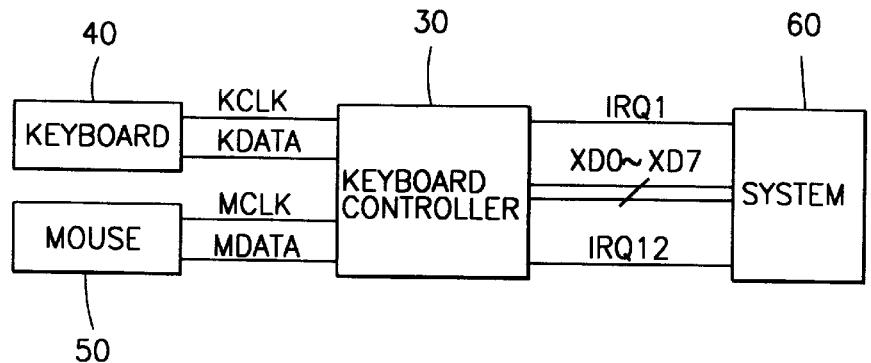
FIG. 1 is a block diagram illustrating a conventional user interface device which uses a keyboard and a mouse as external input devices.
Figure 2:
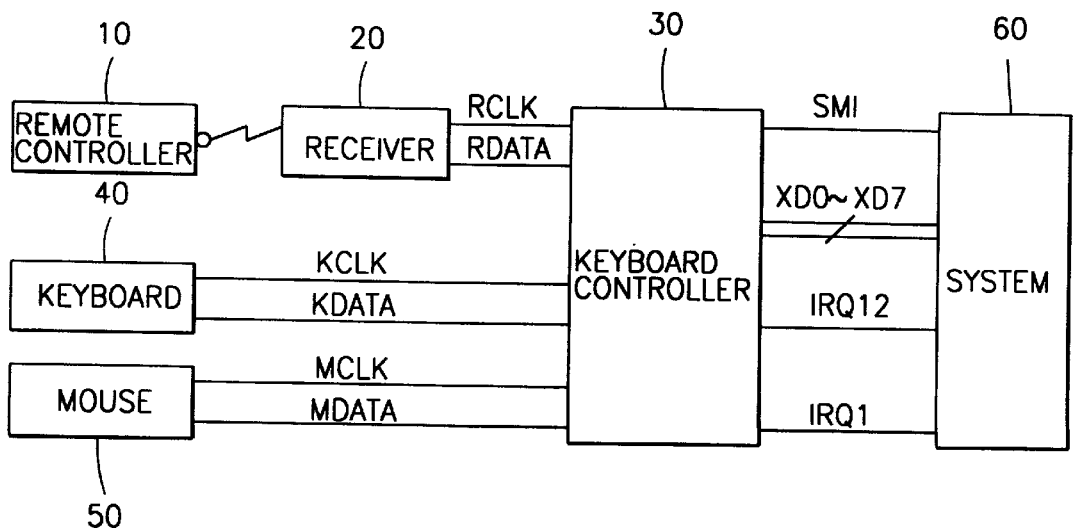
FIG. 2 is a block diagram illustrating another conventional user interface device to which a remote controller is additionally supplied to the construction of the device in FIG. 1.
Figure 3:
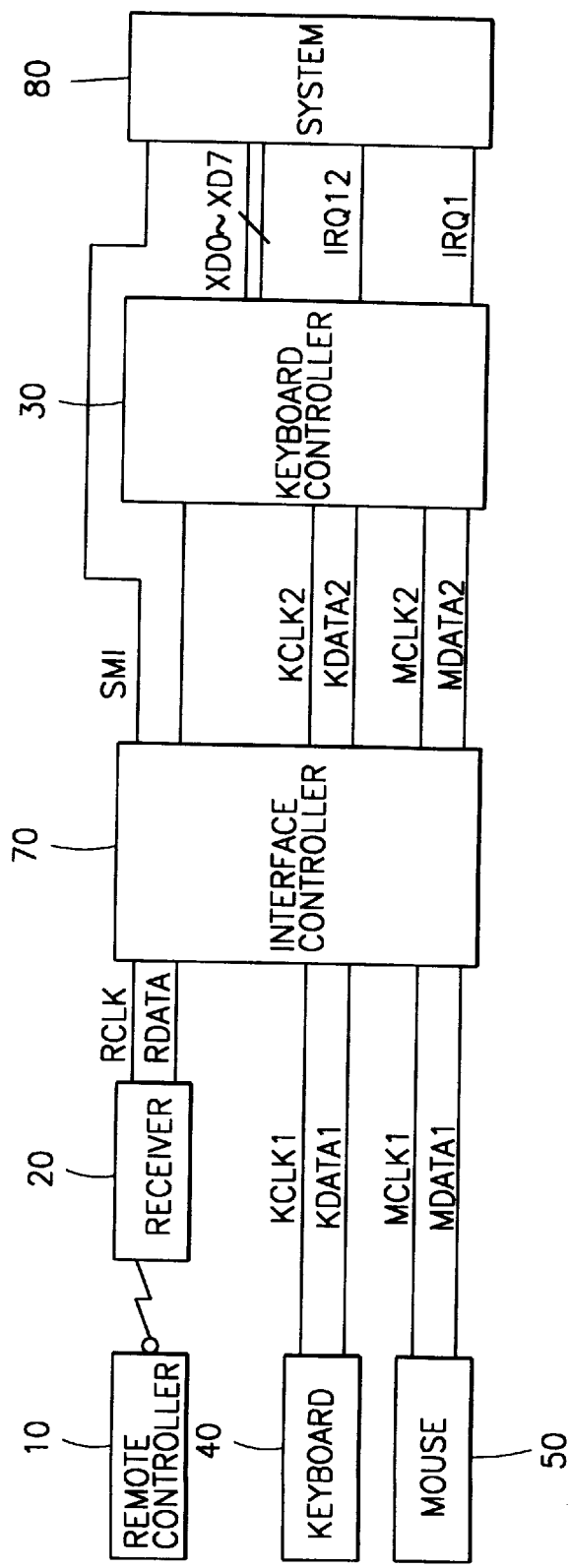
FIG. 3 is a block diagram illustrating a user interface device for a PC system according to a first embodiment of the present invention.

FIG. 3 illustrates a user interface device for a PC system according to a first embodiment of the present invention.

As shown therein, there are a keyboard 40, a mouse 50 and a remote controller 10 as external input devices. The keyboard 40 and the mouse 50 are connected with an interface controller 70 by first clock lines KCLK1 and MCLK1 and first data lines KDATA1 and MDATA1, respectively, and the remote controller 10 transmits a radio signal in accordance with a key operation by a user.

A receiver 20 which is connected to a keyboard controller 30 by a clock line RCLK and a data line RDATA receives the radio signal from the remote controller 10, and supplies key code data corresponding to the radio signal to the interface controller 70 via the data line RDATA. Here, there are two methods for interfacing the remote controller 10 with the receiver 20, that is, an infrared interface and a digital signal interface, and for the smooth interface it is desirable to have an data interface speed within 60 msec.

In addition, a predetermined program is installed in the receiver 20, and the program sets up a time-out of 1 bit or 1 byte unit in order to provide for a case where the data from the remote controller 10 may not be normally transmitted to the receiver 20 due to external interference. If the time-out is generated, the program determines the inputted data as invalid data, for thereby disregarding the inputted 1 byte data. While, when the program determines that the inputted data are valid, the receiver 20 converts the data to serial key code data and transmits the serial key code data to the interface controller 70 in accordance with a clock signal which is supplied from the interface controller 70 through the clock line RCLK, and in this case 1 byte should be transmitted within 2.3 msec.

The interface controller 70 includes an interface BIOS in order to interface with the receiver 20, the keyboard 40, the mouse 50 and the keyboard controller 30. When receiving any command among 4 commands which are outputted from the four devices, the interface BIOS programs that clock lines which are connected to the rest three devices are transited to a low level, in order to prevent the data which are supplied from the rest devices from being lost while receiving the command. To perform real-time form processing, the interface controller 70 should continuously perform polling the four devices.

The interface controller 70 is connected to the keyboard controller 30 through second clock lines KCLK2 and MCLK2 and second data lines KDATA2 and MDATA2.

The interface controller 70 processes keyboard data from the first keyboard line KDATA1 and outputs the resultant data through the second data line KDATA 2, and processes mouse code data supplied through the first mouse line MDATA1 and outputs the resultant data through the second mouse data line MDATA2. Further, in order that the interface controller 70 outputs remote controller key data, particular consideration should be made. First, when the interface controller 70 applies a system management interrupt SMI to a system 80, the system 80 outputs a first command and thus the interface controller 70 outputs the remote controller key data via the second keyboard data line KDATA2, and when the system 80 outputs a second command, the interface controller 70 again outputs the remote controller key data. At this time, it is determined by the second command which data line among the two data lines KDATA2 and MDATA2 will be used for outputting the remote controller key data. In addition, the interface controller 70 outputs the interrupt SMI to the system 80 to process a remote controller code.

Since the connection between the keyboard controller 30 and the system 80 is same as the conventional art, the description thereof will be omitted.

Actual key codes with resect to keyboard, mouse and other predetermined functions are stored as a table in the system 80 so that the system 80 may perform a remote controller key code processing. In accordance with the interrupt SMI outputted from the interface controller 70, the BIOS program of the system 80 prepares for support of a BIOS code by jumping to a corresponding address of the program in the system 80. Next, the system 80 supplies the first command to the interface controller 70 to instruct the interface controller 70 to output the remote controller key code data through the second keyboard data line KDATA2. When receiving the remote controller key code data, the system 80 determines which function the data from the remote controller 10 carries out, by comparing the key code data to the actual key code stored therein. In accordance with the result, the system 80 determines through which line between the second keyboard data line KDATA2 and the second mouse line MDATA2 the controller 70 outputs the remote controller key code data, for thereby outputting a corresponding second command to the interface controller 70. In accordance with the second command, the interface controller 70 outputs the remote controller data through the second keyboard data line KDATA2 or the second mouse line MDATA2. The outputted remote controller data signal is transmitted to an application program of the system 80, and thus the application program performs a necessary function.

When a manufacturer wants to adopt another remote controller, he/she changes the program of the interface controller 70 and the program of the system BIOS in the system 80 in accordance with the adopted remote controller.

Here, since the changing of the construction of the keyboard controller 30 is not required, the keyboard controller 30 can be continuously used.

Now, an operation of each device in accordance with the operation of the remote controller 10 will be described in detail.

First, an operation of the interface controller 70 will be described referring to FIG. 4.

Figure 4:
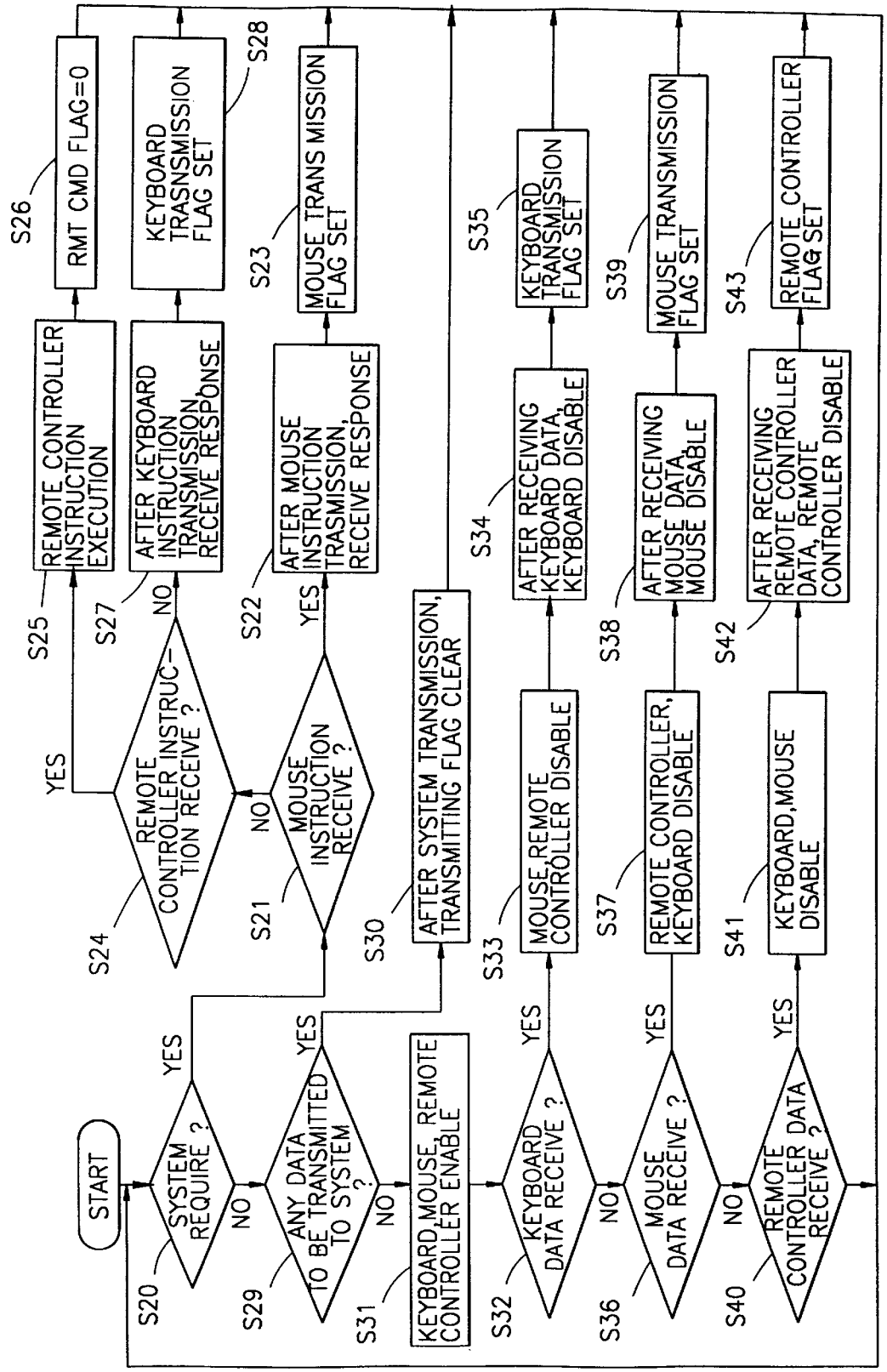
FIG. 4 is a flowchart of an overall operation of an interface controller according to the first embodiment of the present invention.

FIG. 4 illustrates the operation of the interface controller 70 according to a first embodiment of the present invention.

Steps from S20 to S28 explain that the interface controller 70 transmits data supplied from the system 80 to the external devices, and steps from S29 and S30 explain that the interface controller 70 transmits data from the external devices to the system 80, and steps from S32 to S43 describe the process that the data from the external devices are inputted.

In the step S20, the interface controller 70 determines whether the system 80 outputs a command instructing the controller 70 to transmit predetermined data to the external device by judging whether a level of the second clock lines KCLK2 and MCLK2 is '1' and a level of the second data lines KDATA2 and MDATA2 is '0'.

In the steps S21 and S24, the controller 70 determines which external device corresponds to the command from the system 80. When receiving the command via the second mouse lines MCLK2 and MDATA2, the interface controller 70 transmits the command to the mouse 50, receives a corresponding response and sets a mouse transmission flag to transmit the received data in the steps S21 through S23. In addition, among the inputted data, when a RMT cmd flag is '1', indicating that the interface controller 70 transmits the command to the remote controller 10, the interface controller 70 sets a remote controller transmission flag (the steps S24, S25 and S26). In the steps S27 and S28, when instructed that the interface controller 70 transmits the command to the keyboard 40, the interface controller 70 receives a corresponding response and sets a keyboard transmission flag.

Next, in the step S29, the interface controller 70 determines there is any data to transmit to the system 80 by determining whether each of the keyboard, mouse and remote controller flags is '1'.

When having no data to transmit to the system 80, the interface controller 70 enables the keyboard 40, the mouse 50 and the remote controller 10 in the step S31. In the steps S32, S36 and S40, the controller 70 determines any data signal is supplied from the external devices by checking each of the first clock lines KCLK1, MCLK1 and RCLK1 and the first data lines KDATA1, MDATA1 and RDATA. If there is received data, the interface controller 70 stores the received data in a memory such as a buffer, and then disables the rest external devices except the device which has transmitted the data (the steps S33, S37 and S41), and then disables the device after receiving the data (the steps S34, S38 and S42), and sets each of the transmission flags of the external devices as '1' (the steps S35, S39 and S43). When performing the step S38, because a data code from the mouse 50 is comprised of a data packet of 3 bytes, the 3 bytes should be continuously transmitted. Otherwise, there may occur the problem that data from the other devices are transmitted between each byte.

When the steps S35, S39 and S43 are performed, the step S29 is satisfied in the next routine and thus the interface controller 50 performs the step S30 since the received data are stored in the buffer of the memory. The step S30 will be described in detail with reference to FIG. 5.

Figure 5:
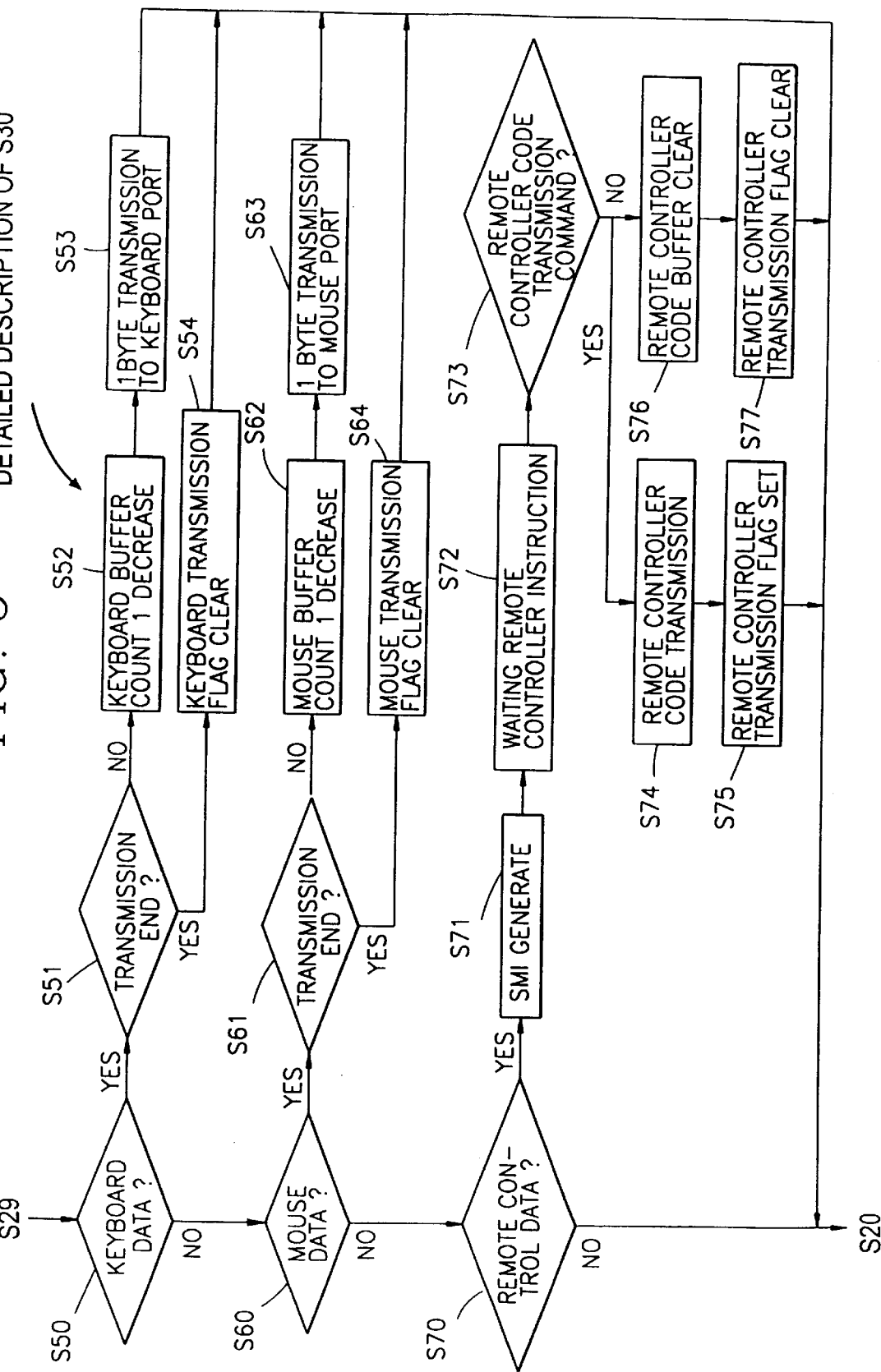
FIG. 5 is a flowchart illustrating a process in which an interface controller transmits data supplied from external devices to a keyboard controller according to the first embodiment of the present invention.

FIG. 5 illustrates a process in which the interface controller 70 transmits data supplied from the external device to the keyboard controller 30 in the operation in FIG. 4.

In steps S50, S60 and S70, the interface controller 70 determines whether there is any data to transmit by confirming that each transmission flag has been set.

In steps S52 and S53, when the keyboard transmission flag is set, the interface controller 70 decrease a keyboard buffer count value by 1 and transmits keyboard key code data of 1 byte to the keyboard controller 30 through the second keyboard line KDATA2. When the transmission is completed, the keyboard transmission flag is cleared in the step S54.

Further, in steps S62 and S63, when the mouse transmission flag is set, the controller 70 decrease a mouse buffer count value by 1 and transmits mouse code data of 1 byte to the keyboard controller 30 through the second mouse line MDATA2. When the transmission is completed, the mouse transmission flag is cleared in the step S64.

In steps S71 and S72, when the remote controller transmission flag is set, the interface controller 70 waits for a remote controller command for a predetermined time after outputting the interrupt SMI to the system 80. The predetermined time is defined as a time required for which the system BIOS of the system 80 outputs a first command permitting the interface controller 70 to transmit the remote controller data after the system 80 has received the interrupt SMI and then the first command is inputted through the keyboard controller 30 to the interface controller 70. In the first embodiment according to the present invention, the predetermined time is set as 500 msec. A step S73 is satisfied, if the interface controller 70 receives the first command from the system 80 within 500 msec, and in steps S74 and S75 the interface controller 70 transmits the remote controller code data to the keyboard controller 30 through the second keyboard data line KDATA2 and sets the remote controller flag. While, if the interface controller 70 does not receive the first command within 500 msec, the interface controller 70 determines that the system BIOS does not support the remote controller interface for thereby clearing the remote controller code buffer and the remote controller transmission flag in the steps S76 and S77.

The keyboard controller 30 supplies the data which is received from the interface controller 70 to the system 80, and also transmits data received from the system 80 to the interface controller 70, which method is same as the conventional art.

The remote controller code data are comprised of 22 bit data including 8 bit ID and 8 bit actual key code data, and there are three types of the remote controller code data according to a kind of the ID. That is, in accordance with the ID, there are keyboard function data, mouse function data or other particular function data such as a volume control function for supporting multimedia.

Figure 6:
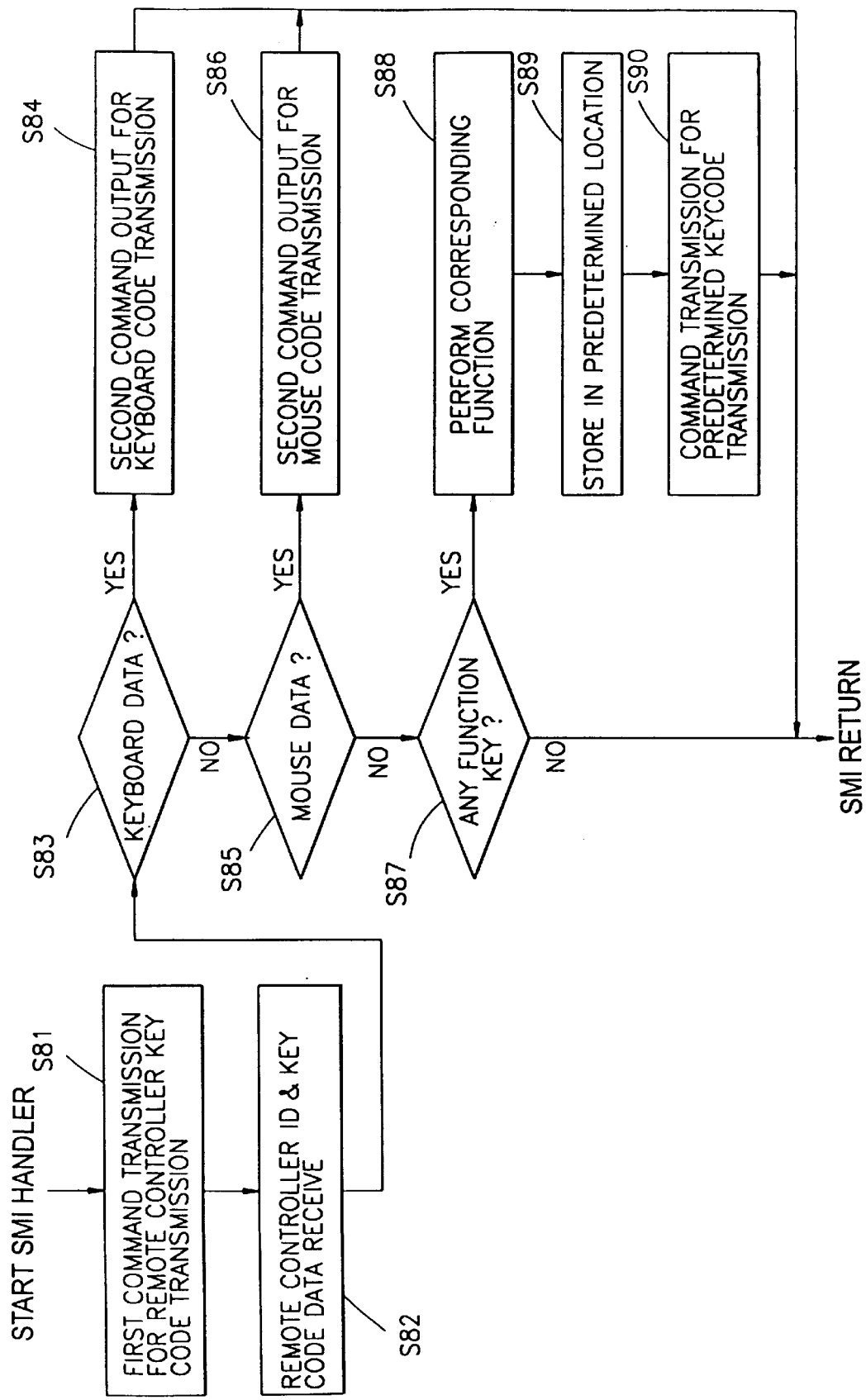
FIG. 6 is a flowchart of an operation of a system in accordance with which the system receives remote controller key code data from an interface controller according to the first embodiment of the present invention.

FIG. 6 illustrates an operation of the system 80 in accordance with which the system 80 receives the remote controller key code data from the interface controller 70 according to the first embodiment of the present invention.

When receiving the keyboard data or mouse data from the interface controller 70, the system 80 performs the corresponding function which is the same as the conventional art. While, when receiving the interrupt SMI for transmitting the remote controller key code data, the system 80 performs t he operation as shown in FIG. 6.

In a step S81, the system 80 transmits the first command to the interface controller 70 instructing that the interface controller 70 transmits the remote controller key code through the second keyboard data line KDATA2. In a step S82, when receiving the remote controller key code comprised of the remote controller ID and the remote controller key code data from the interface controller 70 through the second keyboard data line KDATA2, in steps S83, S85 and S87 the system 80 compares the received remote controller ID and remote controller key code data to the remote controller ID and remote controller key code data which are stored therein, respectively, for thereby determining which function corresponds to the inputted data.

If the inputted data correspond to the keyboard data, the system 80 transmits the second command for keyboard code transmission in a step S84. Here, in accordance with the second command, the interface controller 70 transmits the mouse key code through the second keyboard line KDATA2. The interface controller 70 which has received the second command carries out the steps in FIG. 5, for thereby transmitting the remote controller key code through the second keyboard line KDATA2. The remote controller key code is transmitted to an application program which performs an operation corresponding to the remote controller key code, meaning that the operation corresponding to the keyboard 40 is performed in accordance with the operation of the remote controller 10.

If the inputted data correspond to the mouse data, the system 80 transmits the second command for mouse code transmission in a step 86. The mouse key code transmitted through the second mouse line MDATA2 in accordance with the second command is processed by an application program related thereto, which means that the operation of the mouse 50 is performed in accordance with the operation of the remote controller 10.

After the steps S84 and S86, when having data to supply to the keyboard 40 or to the mouse 50, the system 80 outputs the corresponding key code data to the keyboard controller 30, and the key code data are transmitted though the keyboard controller 30 to the interface controller 70. The interface controller 70 transmits the received key code data to the keyboard 40 through the first keyboard data line KDATA1 or to the mouse 50 through the first mouse data line MDATA1.

When the inputted data correspond to the particular function in a step S87, the system 80 performs the corresponding function in a step S88 and stores the data in a predetermined location such as CMOS, RAM to supply the data to a predetermined program in a step S89. Next, in a step S90, the system 80 outputs a command instructing that the interface controller 70 transmits a predetermined key code corresponding to the predetermined program through the second keyboard line KDATA2 in order to inform a start point from which the program is performed. Accordingly, the interface controller 70 transmits the corresponding key code through the second keyboard line KDATA2.

The predetermined memory location is a domain wherein the use of the PC system at a BIOS level is guaranteed, thus the location should not be used by other application programs in order not to affect the operation of the application program. In addition, the system BIOS reserves a predetermined number of byte in a shadow area of the system BIOS, enables the shadow area when writing the remote controller code in the shadow area, and changes the shadow area to a read only shadow area after writing the code, for thus the predetermined location protects the codes stored in the shadow area from the other application programs.

As described above, according to the first embodiment of the present invention, when changing the key code of the receiver 20, changing a key marking of the remote controller 10, or differently supporting the predetermined functions of the predetermined keys in another system by using the same interface controller, it is possible to change the remote controller data processing function of the system BIOS or change to other key codes. Accordingly, the present invention is capable of supporting other functions without any modification of the remote controller, the receiver and the keyboard controller.

Figure 7:
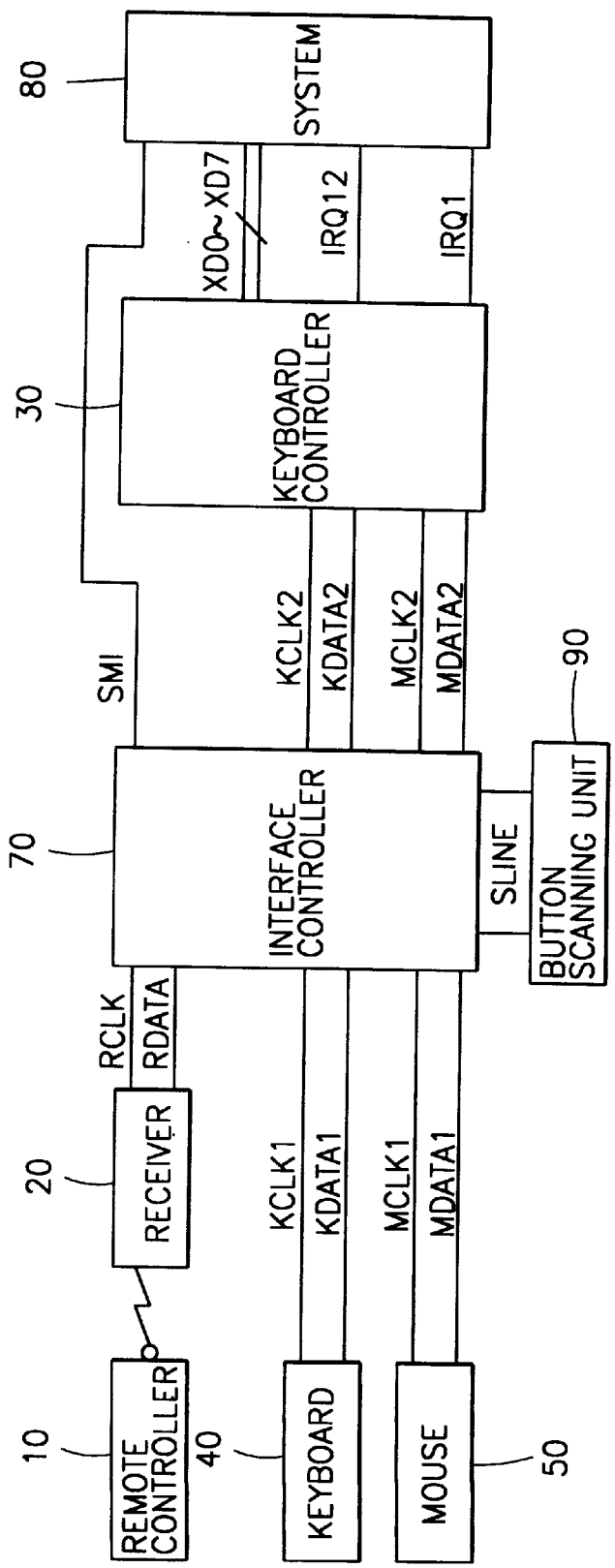
FIG. 7 is a block diagram illustrating a user interface device for a PC system according to a second embodiment of the present invention.

Referring to FIG. 7, an operation of a user interface device according to a second embodiment of the present invention will be described. As shown in FIG. 7, a button scanning device 90 is provided in addition to the construction of FIG. 3. The button scanning device 90 is an external device formed of a key matrix, thus when a button key is pressed, a location of the pressed button is outputted. The button scanning device 90 is connected to the interface controller 70 by a scanning line SLINE. To support the button scanning device 90, output values which respectively correspond to button coordinates are set in the interface controller 70.

A key code with respect to the button scanning device 90 is further stored in the table of the system 80 according to the first embodiment of the present invention, wherein the actual key codes with respect to the keyboard function, the mouse function and other predetermined functions are stored.

An operation of the user interface device according to the second embodiment of the present invention will be described.

The operation of the interface controller 70 and the system −0 in accordance with the operation of the button scanning device 90 is carried out in the same method of the operation of the keyboard 40 and the mouse 50.

The state of the button key is scanned by8 msec, and when the user presses the button key of the button scanning device 90, the a scan line is stored in a low nibble and a return line is stored in a high nibble, for thus a coordinate in accordance with the button key is generated. The generated coordinate is transmitted to the interface controller 70 through the scanning line SLINE, and the interface controller 70 outputs a code corresponding to the coordinate to the system 80, and the process thereof is added next to the step S40 of FIG. 4.

More specifically, the interface controller 70 checks that the scanning line SLINE is '0', for thereby determining whether any of data is transmitted from the button scanning device 90. when receiving the data, the interface controller 70 stores the data in a buffer which is an internal memory, disables the keyboard 40, the mouse 60 and the remote controller 10, and sets a transmission flag as '1' after converting the coordinate of the pressed button to a code having a predetermined value.

Thus, the step S29 of Fig, 4 is satisfied in the next routine, and accordingly the step S30 is carried out. The operation thereof is same as the steps S70 through S77 for processing the remote controller key code data.

The operation of the keyboard controller 30 is identical with the operation according to the first embodiment of the present invention.

The operation of the system 80 is carried out in the same method as the steps S87 through S90 of FIG. 6. That is, after receiving the remote controller key code comprised of the remote controller ID and key code data, if the received data correspond to data of the button scanning device 90, the system 80 performs a corresponding function in accordance with corresponding coordinate data and stores the received data in a predetermined location. After storing the data, the system 80 carries out the steps S88 through S90 of FIG. 6.

As the button of the button scanning device 90 is shifted to another coordinate in a different location, or a new button is added according to the second embodiment of the present invention, if the function of the button scanning device 90 is changed, the changed function can be processed by changing the program of the system BIOS.

Although, in the second embodiment of the present invention, the button scanning device 90 is added to the construction of the first embodiment thereof. However, the operation of the interface controller 70 and the system 80 in accordance with the button scanning device 90 is identical with the operation to process the particular function data among the three functions in accordance with the remote controller.

As described above, the user interface device according to the present invention may support the external input devices having various functions by changing the program of the hardware without changing the hardware itself although the functions of the external input devices are changed or a new external input device is supplied.

It will be apparent to those skilled in the art that various modifications and variations can be made in the user interface device for the PC system of the present invention without departing from the spirit or scope of the invention. Thus, it is intended that the present invention cover the modifications and variations of this invention provided they come within the scope of the appended claims and their equivalents.

What is claimed is:

1. A method of controlling an input signal in a personal computer (PC) system having a remote controller detached from the PC system and transmitting a remote signal, a main system having an input control program, an interface controller providing an input key code signal corresponding to said remote signal, and a keyboard controller providing an output key code signal corresponding to said input key code signal to the main system, comprising:

providing a system management interrupt (SMI) signal from the interface controller to the main system in response to said remote signal;

providing a first transmission command signal from the main system in response to the SMI signal;

providing said input key code signal from the interface controller in accordance with the first transmission command signal;

determining a function corresponding to said input key code signal;

providing a second transmission command signal based on said function; and repeatedly providing said input key code signal from the interface controller in accordance with the second transmission command signal.

2. The method according to claim 1, further comprising providing an input data signal from a keyboard or a mouse physically coupled to the PC system; and providing a key code signal corresponding to said input data signal from the interface controller.

3. The method according to claim 1, further comprising:

storing said input key code signal in the interface controller; and clearing said input key code signal from the interface controller when the interface controller does not receive the first transmission command from the main system for a predetermined time after the interface controller provide the SMI signal to the main system.

4. The method according to claim 3, wherein the predetermined time is 500 milliseconds.

5. The method according to claim 1, further comprising:

determining whether said input key code signal corresponds to a particular function; and storing said input key code signal in the main system based on a result of the determination.

6. A personal computer (PC) system, comprising:

a remote controller detached from the PC system and transmitting a remote signal;

a main system having an input control system program;

an interface controller providing a system management interrupt (SMI) signal to the main system in response to said remote signal, and providing an input key code signal corresponding to said remote signal, wherein the interface controller includes means for storing said input key code signal, and means for clearing a stored input key control signal if the interface controller does not receive the first transmission command from the system for a predetermined time after the interface controller provides the SMI signal to the main system, and wherein the main system includes means for generating a first transmission command signal in response to said SMI signal; and a keyboard controller providing an output key code signal, corresponding to said input key code signal, to the main system.

7. The PC system according to claim 6, further comprising:

a keyboard physically coupled to the system for providing a keyboard signal; and a mouse physically coupled to the system for providing a mouse signal.

8. The PC system according to claim 6, wherein the predetermined time is 500 milliseconds.

9. A personal computer (PC) system, comprising:

a remote controller detached from the PC system and transmitting a remote signal;

a main system having an input control system program;

an interface controller providing a system management interrupt (SMI) signal to the main system in response to said remote signal, and providing an input key code signal corresponding to said remote signal wherein the interface controller has a plurality of output data lines, and includes means for providing said input key code signal in accordance with the first transmission command signal, and for repeatedly providing said input key code signal through one of said plurality of output data lines in accordance with the second transmission command signal, wherein the main system includes means for generating a first transmission command signal in response to said SMI signal and means for determining a function corresponding to said output key code signal and providing a second transmission command signal based on said function; and a keyboard controller providing an output key code signal, corresponding to said input key code signal, to the main system.

10. The PC system according to claim 9, further comprising:

a keyboard physically coupled to the system for providing a keyboard signal; and a mouse physically coupled to the system for providing a mouse signal.

11. A personal computer (PC) system, comprising:
a remote controller detached from the PC system and transmitting a remote signal;
a main system having an input control system program;
an interface controller providing a system management interrupt (SMI) signal to the main system in response to said remote signal, and providing an input key code signal corresponding to said remote signal wherein the interface controller includes first and second data lines, and wherein the interface controller includes means for providing said input key code signal through the first data line in accordance with the first transmission command signal, and for repeatedly providing said input key code signal through one of the first and second data lines in accordance with the second transmission command signal, wherein the main system includes means for generating a first transmission command signal in response to said SMI signal, and means for determining a function corresponding to said output key code signal and providing a second transmission command signal based on said function; and
a keyboard controller providing an output key code signal, corresponding to said input key code signal, to the main system.

* * * * *